UNITED STATES PATENT OFFICE.

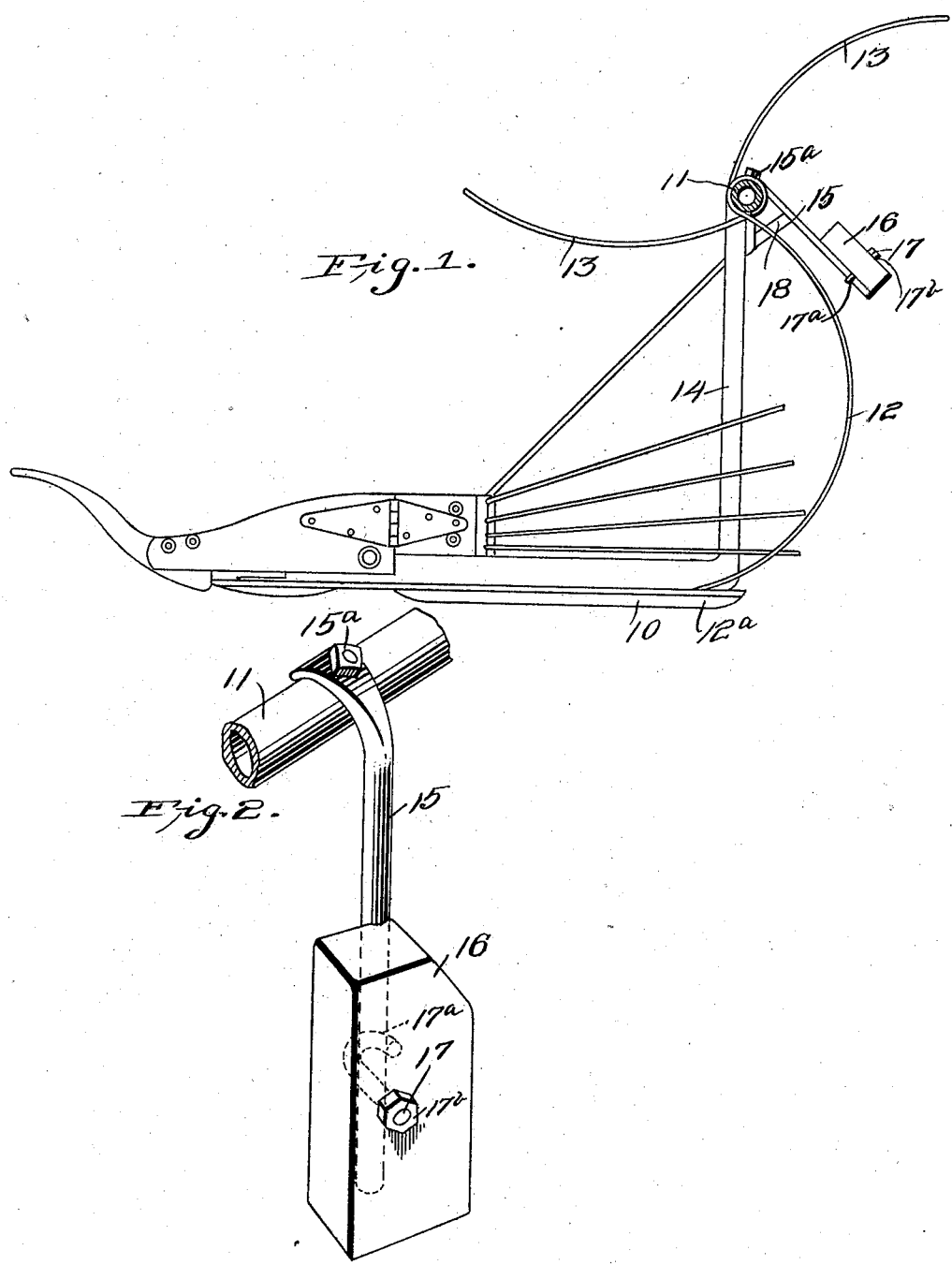

CHRISTIAN C. BEHM, OF BLOOMVILLE, OHIO.

CLOVER-BUNCHER.

SPECIFICATION forming part of Letters Patent No. 717,529, dated January 6, 1903.

Application filed April 17, 1902. Serial No. 103,395. (No model.)

*To all whom it may concern:*

Be it known that I, CHRISTIAN C. BEHM, a citizen of the United States, residing at Bloomville, in the county of Seneca and State of Ohio, have invented a new and useful Clover-Buncher, of which the following is a specification.

This invention relates to machines employed in assisting in harvesting clover and similar products; and it consists in an attachment whereby the buncher-teeth are maintained yieldably in operative position and automatically returned to their operative position after the discharge of each bunch, as hereinafter shown and described, and specifically pointed out in the claims.

The device can be applied to any of the various forms of machines employed for the purpose of "bunching" clover and similar products; but for the purpose of illustration I have shown it applied to an approved form of such machines, Figure 1 representing a longitudinal section with the improvement applied thereto. Fig. 2 is a perspective view of the device detached.

The base or gather-table of the "buncher" is represented at 10 and the tooth-head at 11, carrying the teeth (represented at 12) and the guards, (represented at 13). The head is supported by standards 14, rising from the base-frame. All these parts are of the usual construction and represent a conventional form of a machine of this class.

The invention which is the subject of the present application consists of an arm or lever 15, bolted or otherwise connected to the tooth-head 11, as at $15^a$, and supporting a weight 16, the latter adjustably connected to the arm by a bolt 17, as shown. The weight 16 will extend rearwardly of the teeth 12, and thus exert a constant downward force to maintain the lower or free ends $12^a$ of the teeth 12 normally in proper working position with relation to the gather-frame, as shown in Fig. 1, and in order that this force may not carry the teeth too far forward a stop 18 is provided to support the weight and limit its downward movement. The weight, as before stated, is adjustable upon the rod 15, so that it can be adapted to the work required of it and the force which it exerts upon the teeth 12 increased or decreased by moving it nearer to or farther away from the tooth-head 11. The bolt 17 is formed with a hook $17^a$ at one end and a nut $17^b$ at the other end, the hook engaging the arm 15 and maintaining it in a groove in the weight, so that one of the bolts only will be required to secure the weight in place. By this simple means the teeth 12 are maintained yieldably in working position, and when the tooth-head 11 is rotated to elevate the teeth 12 and allow the gathered "bunch" to pass off from the gather-table the weight will be elevated, and when the tooth-head is released the weight will automatically return the teeth to their normal operative position.

The weights may be of any size and as many may be employed upon each tooth-head as required; but generally one will be sufficient, as shown.

Having thus described my invention, what I claim is—

1. In a clover-buncher, a gather-table, standards rising from the same, a transverse shaft supported by said standards and forming the tooth-head, teeth and guards attached to and projecting from said head, an arm attached to and extending radially from the tooth-head, and disposed to swing upwardly when the teeth swing rearwardly in the act of discharging a bunch, a weight secured adjustably to said arm, and a stop extending from one of the standards to limit the downward movement of the arm.

2. In a clover-buncher, the combination with a gather-table having standards rising therefrom, of a rock-shaft journaled to said standards and provided with radially-extending teeth and guards, and an arm secured to and extending radially from said rock-shaft and carrying a weight disposed to counteract the rearward pressure against the teeth of the rock-shaft.

In testimony that I claim the foregoing as my own I have hereto affixed my signature in the presence of two witnesses.

CHRISTIAN C. BEHM.

Witnesses:
J. F. WALKER,
C. W. KIEFFER.